United States Patent [19]

Bleymaier et al.

[11] 4,322,380

[45] Mar. 30, 1982

[54] METHOD FOR FEEDING AND ORIENTING FIBROUS FURNISH

[75] Inventors: Joseph S. Bleymaier, Columbia, Md.; Wilfred Farnworth, Clinton, Wash.; Thomas E. Peters, Boise, Id.

[73] Assignee: Morrison-Knudsen Forest Products Company, Inc., Boise, Id.

[21] Appl. No.: 197,178

[22] Filed: Oct. 15, 1980

Related U.S. Application Data

[62] Division of Ser. No. 4,858, Jan. 19, 1979, Pat. No. 4,255,108.

[51] Int. Cl.[3] .......................... B29J 5/00; D04H 1/00

[52] U.S. Cl. .......................................... 264/24; 19/144; 19/296; 156/62.2; 198/532; 264/40.1; 264/109

[58] Field of Search ................. 19/302, 304, 144, 296; 264/109, 113, 24, 112, 115, 122, 40.1, 40.7; 425/80.1, 81.1, 82.1, 83.1, 174.8 E; 156/62.2, 62.4; 198/532, 526, 669; 222/265, 281, 318

[56] References Cited

U.S. PATENT DOCUMENTS

| | | | |
|---|---|---|---|
| 1,850,325 | 3/1932 | Jordan | 198/669 |
| 1,909,722 | 5/1933 | Roan | 198/669 |
| 2,230,018 | 1/1941 | Stromstad | 198/669 |
| 2,332,688 | 10/1943 | Baily | 198/669 |
| 2,467,291 | 4/1949 | Brelsford et al. | 19/302 |
| 2,665,453 | 1/1954 | Senior et al. | 19/302 |
| 2,678,081 | 5/1954 | Rainard et al. | 264/109 |
| 2,737,997 | 3/1956 | Himmelheber et al. | 19/300 |
| 2,744,045 | 5/1956 | Collins | 264/113 |
| 2,744,848 | 5/1956 | Mottet | 264/109 |
| 2,822,024 | 2/1958 | Himmelheber et al. | 264/109 |
| 2,890,146 | 6/1959 | Unsworth | 425/81.1 |
| 2,923,030 | 2/1960 | Himmelheber et al. | 19/302 |
| 3,155,755 | 11/1964 | Schulz et al. | 264/109 |
| 3,230,287 | 1/1966 | Caron et al. | 264/109 |
| 3,340,127 | 9/1967 | Buerkner | 19/300 |
| 3,737,265 | 6/1973 | Schafer et al. | 19/300 |

*Primary Examiner*—Willard E. Hoag

*Attorney, Agent, or Firm*—Shanley, O'Neil and Baker

[57] ABSTRACT

Methods are presented for continuous-line manufacture of composition board from furnish which is moved in a continuous-flow manner through a processing line and distributed for deposition at a uniform rate over a preselected area to continuously form a mat for compaction. Commercially economical production flow rates are achieved with a lightweight refined wood furnish to form fiberboard having directional properties without relying on pneumatic impulsion while uniformly distributed furnish is delivered substantially free of air turbulence effects enabling fiber orientation by means of an electrical field.

Control of movement and accurate metering of furnish are facilitated by continuously over-feeding furnish into the processing line and returning excess furnish as part of an initial distribution of furnish over one dimension of the mat to be formed. The initially distributed furnish is confined in the remaining dimension while being continuously moved in the direction of the mat; the confined profile feed is metered, accelerated by mechanical contact, and then distributed over the full area of deposition. Lightweight fibrous furnish is delivered for screening to separate fiber clusters followed by electrical field orientation of individualized fibers and deposition. The furnish distributed over the forming area is moved along a flow path which is substantially normal to the surface of deposition.

14 Claims, 8 Drawing Figures

124
122

8
120
8
116
118

80
93
92
78
84
91
90

52
74
64
78
68
66

78
116
7
7
116

METHOD FOR FEEDING AND ORIENTING FIBROUS FURNISH

This is a division of application Ser. No. 004858, filed Jan. 19, 1979, now U.S. Pat. No. 4,255,108, the entire disclosure of which is incorporated herein by reference.

This invention relates to methods and apparatus for uniform handling of particulate matter in the manufacture of composition board.

In one of its specific aspects, the invention is concerned with uniform distribution and delivery of lightweight, comminuted fibrous material for continuous-line formation of fiberboard having directional properties. Examples of a lightweight furnish handled by the present invention are the fibrous materials produced from wood pieces by disk refining in an attrition mill in the presence of steam at atmospheric or higher pressure. The resultant lightweight comminuted fibrous furnish exhibits a bulk density of about one to approximately four pounds per cubic foot. The fibers are fine in texture, elongated, and tend to cluster. Also, the fibers, especially wood fibers refined with steam above atmospheric pressure, can exhibit aerodynamic properties tending to diminish free-fall velocities.

It was previously considered necessary to use pneumatic impulsion handling methods for such lightweight fibrous furnish. However, in addition to fiber clustering difficulties, orientation control utilizing an electric field can be rendered ineffective because of air turbulence when using pneumatic impulsion and obtaining the desired uniformity of deposition becomes impracticable.

The present invention contributes controlled handling and metering to provide continuous movement of the furnish at a substantially constant weight-per-unit-time through the processing line.

Utilizing the teachings of the invention, a lightweight disk refined fibrous furnish can be handled without relying on pneumatic impulsion for movement of such furnish to achieve commercially acceptable flow rates. Air turbulence effects are substantially eliminated while providing for uniform distribution and deposition of the lightweight furnish. Commercially economic production rates of fiberboard are made practicable while enabling desired orientation of fibers by means of an electric field.

The significance of these contributions and other advantages are considered in a more detailed description of the invention which includes reference to the accompanying drawings. In these drawings.

A significant contribution of the invention involves continuous over-feed of furnish into the processing line to eliminate possible problems associated with interrupted or cyclic movement of particulate material, bulk density changes in the material, or surges related to pneumatic transport of furnish to inlet means for the forming line.

Figure 1:
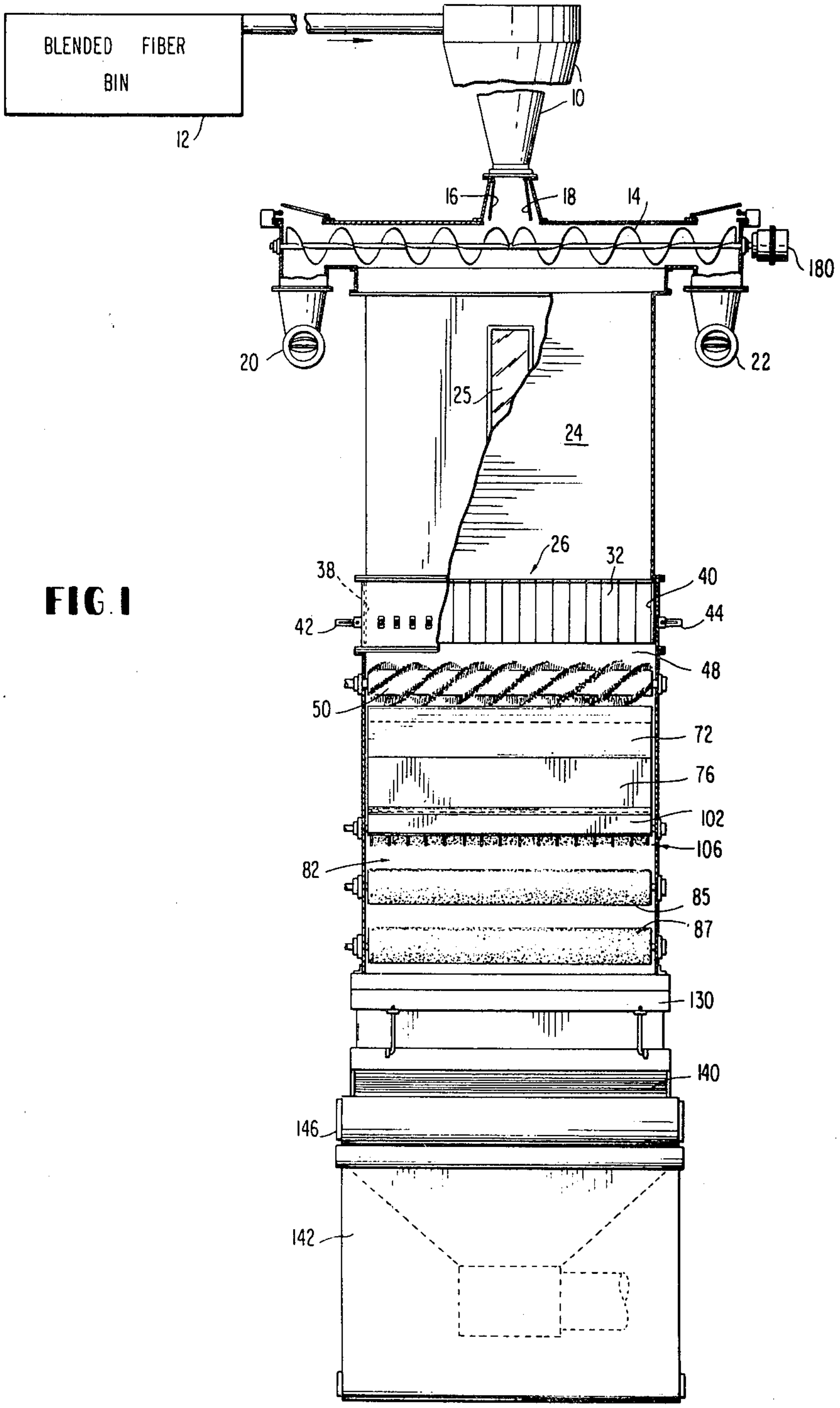
FIG. 1 is a schematic view in elevation, with portions cut away, of apparatus embodying the invention.
Figure 2:
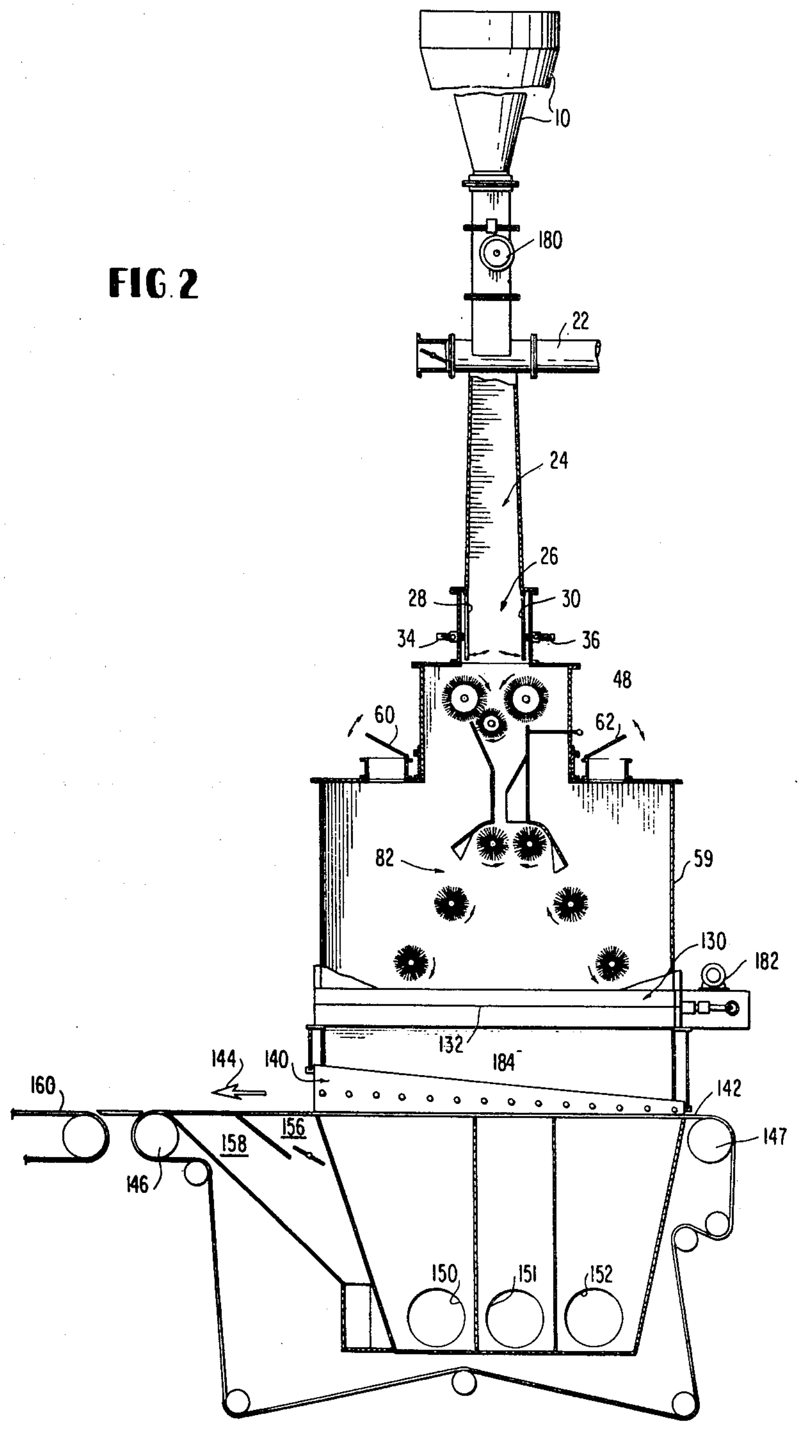
FIG. 2 is a schematic cross-sectional view in elevation of the apparatus of FIG. 1 embodying the invention.

In a specific embodiment of the invention for handling lightweight fibrous furnish, cyclone 10 of FIGS. 1 and 2 is provided to separate air when pneumatic flow is used for transporting fibrous material from blended fiber bin 12 (FIG. 1) to such cyclone hopper means. The furnish is fed continuously from cyclone 10 into the distribution and deposition equipment. The furnish is first distributed over one dimension of the mat being formed; as shown, in the cross direction i.e. perpendicular to the mat forming direction for the line.

The furnish from cyclone 10 is fed at a rate in excess of the mat deposition rate. Bidirectional feed screw 14 moves the furnish across the lateral dimension which is correlated with, and preferably approximately equal to, the lateral dimension of the mat being formed.

Discharge of furnish in the forward direction, i.e. toward the mat being formed, from bidirectional screw 14 is uniform across the selected dimension. Flop gates 16 and 18 at the discharge opening of cyclone 10 are adjusted so that the quantity of furnish overflowing from the ends of bidirectional screw is equal. Excess furnish is returned from ends of the bidirectional feed screw 14 through vacuum return conduits 20 and 22.

The laterally distributed furnish moves in the forward direction into a flow-through chamber 24 (shown partially cut away, with a viewing glass 25, in FIG. 1) which functions as a metering bin for the furnish. Lateral distribution is maintained in the flow-through chamber 24 by providing a lateral dimension which is correlated with, and preferably substantially equal to, the lateral dimension of the mat being formed.

The furnish is accumulated to a uniform height across the lateral dimension of flow-through chamber 24. The continuous flow feature made available at this stage by continuously feeding furnish in excess of that to be distributed while returning excess enables a constant head of furnish to be maintained in chamber 24 without "on-off" controls. This provides more accurate metering while maintaining the continuous flow taught for avoiding the handling problems previously encountered with lightweight furnish.

Flow-through chamber 24 includes a profiling chamber 26 at its discharge end which establishes a configuration for the furnish which facilitates metering. Profiling chamber 26 presents a discharge opening having a lateral dimension substantially equal to that of the laterally distributed furnish. One purpose of the profiling chamber 26 is to control and maintain uniform fiber weight over the distributed dimension. In the illustrated embodiment the initial distribution is in the cross-machine direction; therefore, the profile of the furnish in the machine-forming direction is confined to a fractional portion of the machine-forming dimension established for mat forming deposition of furnish. Compression of the furnish in the machine-forming direction is controlled, e.g. by adjustable baffle structure 28, 30 (FIGS. 2 and 3) located along each extended length sidewall internally of the profiling chamber. A plurality of individually adjustable baffles, such as 32 (FIG. 1) are aligned to adjust the profile. Baffle adjusters, such as 34, 36 are connected to each such baffle. Baffles 38 and 40 at the ends of profiling chamber 26, which are adjustable by means of lateral adjusters 42, 44, maintain the lateral distribution dimension for proper feeding into the next element in the line.

Figure 3:
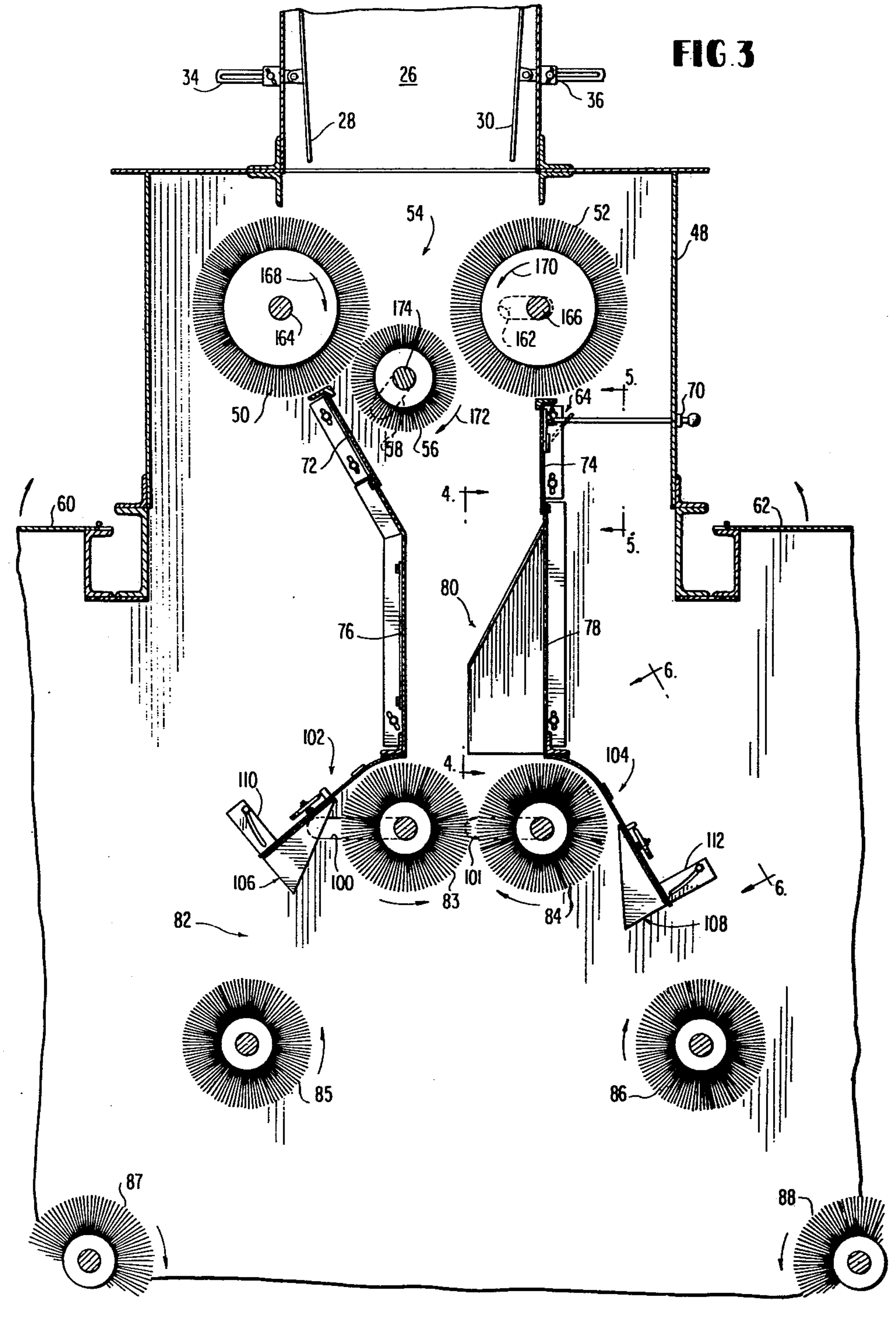
FIG. 3 is an enlarged view of a portion of the apparatus of FIG. 2.

Profiling chamber 26 leads into metering chamber 48 (FIGS. 2 and 3). Metering rolls 50, 52 (FIG. 3) are disposed in chamber 48 with their longitudinal axes of rotation extending along the dimension of distributed furnish. Contact surfaces of the metering rolls 50, 52 establish a cross-sectional periphery which extends to boundaries of the discharge opening established within the profiling chamber 26. Such contact surfaces positively grip the furnish, compressing the furnish in a preselected manner which facilitates metering while moving the furnish in the forward direction. Metering nip 54 is defined by the metering rolls 50, 52 to have a preselected cross-sectional area. Rotation of metering rolls 50, 52 is continuous with RPM controlled to move furnish in the forward direction at a uniform controlled rate without relying on pneumatic impulsion.

Scalping roll 56 is positioned below the metering nip 54. The weight of the furnish column extending upwardly through the metering nip 54 and into chamber 24 is partially supported by positioning of the scalping roll 56 in the flow path from the metering rolls, generally slightly off center of such flow path. A slot 58 for adjustable positioning of scalping roll 56 is shown by dotted line. Such furnish column support provides better metering control by enabling the furnish to remain under the control of the metering rolls 50, 52 in the metering nip 54. Also, haphazard break-up of the controlled-configuration furnish after exit from the metering nip 54 is avoided. The furnish is delivered in a controlled manner avoiding irregular falling or avalanching of furnish into the next downstream element.

The RPM of scalping roll 56 is controlled to provide a high surface velocity. Impingement on scalping roll 56 not only provides for uniform forward movement of the furnish but also provides forward momentum of lightweight furnish for maintaining desired production flow rate through the processing line during subsequent distribution over the full area of deposition. The high surface velocity of scalping roll 56 is imparted to the controllably metered furnish. Thus, accurate metering control of a relatively slow moving compressed furnish column is obtained at rolls 50, 52 while enabling acceleration after metering.

It has been found that the high velocity imparted to the furnish by the scalping roll 56 after the relative low velocity movement through the metering rolls 50, 52 can create a need for replacement air as the furnish is suddenly accelerated. In order to avoid air flowing countercurrent to the forward direction of movement of the furnish, air hatches are provided to allow outside air to enter the former shell and interior sub-structure. Such entry of air is at a location removed from the mat being formed so as to avoid any air turbulence effect on the mat or any orientation function.

Entry of air into outer shell 59 of the former is through air hatches 60, 62 (FIGS. 2 and 3). Air access into the scalper roll area is controlled by damper means 64 (FIG. 3) which includes a plurality of individual air dampers, such as 66, 68 (FIG. 5) distributed along the lateral dimension. Damper adjustment means 70 (FIG. 3) provide for damper adjustment from externally of the forming line shell; each damper, such as 66, 68, can include such an adjustment means for uniform air admission across the distributed dimension.

The furnish as delivered from the scalping roll 56 is moving in the forward direction at a velocity substantially equal to the surface velocity of the scalping roll. A chute structure is formed within the former shell to properly direct furnish for distribution over the remaining dimension of deposition. This chute structure can include a cleaning plate associated with each feeder roll. As shown in FIG. 3, cleaning plate 72 for metering roll 50 and cleaning plate 74 for metering roll 52 are adjustably mounted to control contact with each metering roll. This cleaning action preserves the gripping strength of the metering rolls by eliminating fiber buildup.

The chute structure includes sidewalls 76, 78 (FIG. 3) leading to the inlet side of means for distributing furnish over the remaining dimension of mat deposition. A furnish flow splitter structure 80 (FIG. 3) is located in the chute downstream of the metering rolls in the direction of further distribution means.

The high-velocity, longitudinally-confined furnish is directed to distribution means which spread the confined furnish over the full area of deposition. This distribution means controllably reduces forward velocity of the furnish while maintaining the desired constant weight per unit time movement of furnish.

The initial distribution of the furnish which is maintained in the flow-through chamber 24 and during metering, is also maintained during distribution of the furnish in the machine-forming direction, i.e. over the longitudinal dimension of the mat being formed. Contact of the furnish with the scalping roll 56 initiates the uniform break-up of the metering configuration and imparts desired forward movement to the furnish without relying on pneumatic pressure.

After contact with scalping roll 56, the furnish is directed toward longitudinal distribution means 82. A plurality of distribution rolls 83 through 88 are arranged in banks to impart a horizontal component of movement and to move the furnish between and about the distribution brush rolls. Uniform longitudinal distribution is provided along with controlled movement of furnish in the forward direction over substantially the full preselected area of deposition for forming a mat.

In the embodiment shown, the banks of distribution brush rolls are arranged, when viewed axially, to form sides of a triangular configuration having an apex portion pointed in the direction of the scalping roll 56. A remaining side of the triangle, opposite to such apex portion, extends over substantially the full longitudinal dimension of the area of deposition and is disposed in the direction of the mat to be formed.

This arrangement provides for uniform longitudinal distribution. Also movement in the forward direction can be carried out substantially free of pneumatically imparted velocity so as to provide for fiber orientation by means of an electrical field. The high forward velocity imparted by the scalping roll 56 is controlled by the longitudinal distribution brush rolls 83 through 88. A longitudinal movement, transverse to the forward direction, is imparted so that discharge from the brush rolls in the forward direction is controlled. Also, the interaction of the longitudinal distribution brush rolls helps to break up large clumps of furnish which might exist.

For uniformity of distribution purposes, it is preferred to have substantially equal portions of the furnish be handled by each half of the distribution means 82. Splitter 80 is adjustably mounted to provide the desired diversion of furnish. As can be visualized from the detailed view of splitter 80 in FIG. 4, baffle structures such as 90, 91 direct a portion of the furnish toward distribution roll 83 and the open portions such as 92, 93 direct the remaining portion of the furnish toward distribution roll 84. The distribution brush rolls 83, 84 can be adjustably positioned by means of the slots 100, 101 shown in dotted lines in FIG. 3. Shroud structure 102, 104 partially surrounds distribution rolls 83, 84, respectively. Each shroud structure includes a plurality of vanes and adjustment means. The vane structure can be moved toward and away from the axis of the distribution brush rolls 83 and 84 by slotted adjustment arms 110 and 112.

Figures 4, 5, 6, 7, 8:
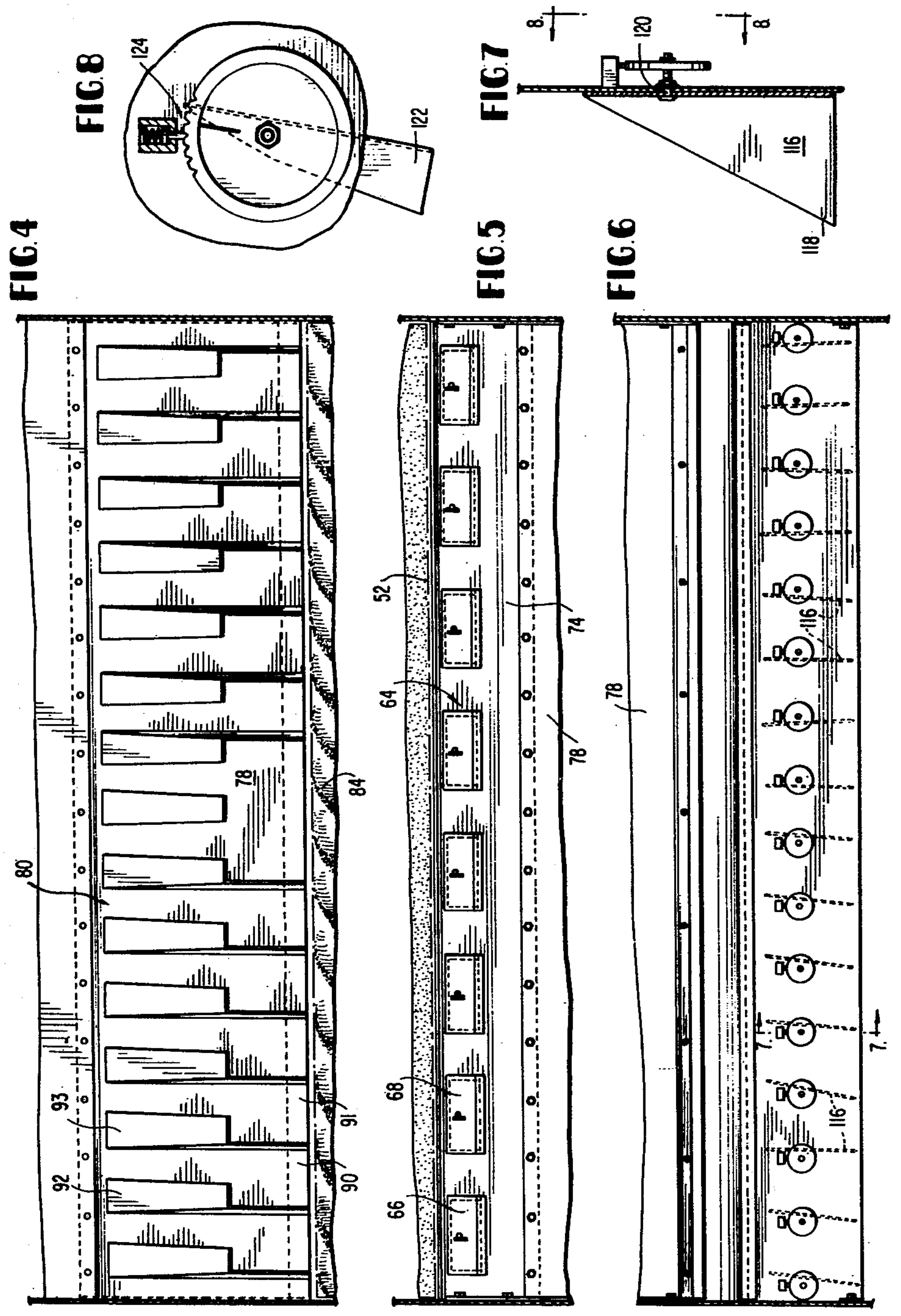
FIG. 4 is a view of flow-splitter apparatus taken along the line 4—4 of FIG. 3.
FIG. 5 is a view of damper-venting apparatus taken along the line 5—5 of FIG. 3.
FIG. 6 is a view of shroud control apparatus taken along the line 6—6 of FIG. 3.
FIG. 7 is a view taken along the line 7—7 of FIG. 6.
FIG. 8 is a view taken along the line 8—8 of FIG. 7.

The vanes help guide the moving furnish to maintain, or adjust for, uniformity in the lateral dimension distribution. Each of the plurality of vanes along the lateral dimension can be made adjustable for this purpose. For example, vane 116 shown in detail in FIG. 7 is adjustable so that its end portion 118 moves in a laterally oriented arc, with respect to the mat being formed, by pivoting about axis 120. Adjustment control 122 with positive lock means 124 is shown in detail in FIG. 8. Various adjusted positions of the plurality of vanes, along the axial length of a distribution roll, are shown by dotted lines in FIG. 6.

The longitudinal dimension of distribution provided by distribution means 82 and the longitudinal dimension of the preselected area of deposition are correlated; preferably they are substantially equal. In this way, the distributed furnish moves in the forward direction through the remainder of the processing line over the full cross-sectional area selected and established for deposition. This substantially eliminates furnish flow problems and also helps eliminate the introduction of extraneous forces which can result from changing the cross-sectional area of the flow path, or the direction of the flow path, in approaching deposition.

A commercially acceptable continuous flow rate can be maintained for lightweight fibrous furnish while allowing adequate space and time for fiber separation and orientation. The furnish, as discharged from the longitudinal distribution means 82 is moving forward over the full area of intended deposition. The uniformly distributed furnish is delivered by the longitudinal distribution means 82 into screening chamber 130 (FIG. 2). A screening means 132 within chamber 130 extends over substantially the full area of deposition. Small clusters of fibers which may remain in lightweight fibrous furnish are separated in the screening means to deliver discrete fibers; workable screening means are known in the art and can include a plurality of closely spaced wires extending longitudinally over an area at least equal to that selected for deposition of fibrous material.

The cross-sectional area (transverse to the direction of furnish flow) of orientation chamber 140 (FIG. 3) is substantially equal to the area of deposition. The furnish is deposited on a surface presented by continuously moving web support 142. Details of a preferred electrical orientation structure for lightweight fibrous furnish are described in copending application Ser. No. 4,857, filed Jan. 19, 1979, entitled "Orientation and Deposition of Fibers in the Manufacture of Fiberboard", which is incorporated herein by reference. The mat formed on support web 142 is moved into apparatus (not shown) for compaction and curing under pressure and heat to form the end product fiberboard.

Support web 142 can be an endless belt, moving in the direction of arrow 144, guided and driven by roll means such as 146, 147. This forming conveyor surface is preferably foraminous. In place of the usual bronze fourdrinier wire, support web 142 can be formed from filament having desired dielectric properties when electrical orientation is used; e.g. support web 142 can be woven from nylon filament.

For purposes of reducing random dust escape from the forming line shell when working with lightweight fibrous furnish, the pressure can be maintained slightly negative subsurface of support web 142 by any suitable suction means. Butterfly valves 150, 151, 152 and compartmentation can be provided to distribute and extend a slight negative pressure to the peripheries of the structure. A negative pressure of about 0.25" of water is recommended to help reduce ambient dust while not adversely affecting orientation when working with fine fibers.

Access of air to the forming line shell is provided at a removed location, e.g. through dampers 60, 62 to avoid possible adverse effects of incoming air on the mat. Thus, inrush of air as the mat exits from the forming chamber is substantially eliminated even when negative pressures greater than recommended to reduce ambient dust are utilized. Also, the negative pressure in chamber 156 can be adjusted to help consolidate the mat upon or after exit from the mat forming area. In chamber 158, the negative pressure should be strong enough to help prevent fracture as the mat is transferred from the continuous filament belt 142 onto belt 160 for transport to press.

The combination of elements described moves the furnish continuously without interruption of forward movement through the process line with no need to rely on pneumatic impulsion for movement of lightweight fibrous furnish. Furnish uniformly distributed over the full area of deposition is moved along a flow path which is normal to the area of deposition. In working with furnish which is to be directionally oriented, this flow path is provided prior to entry into the orientation chamber 140. This permits effective orientation at commercially economical production rates of lightweight furnishes in an electric field.

Referring to the metering section of the enlarged view in FIG. 3, the profiling chamber 26 establishes the dimensions and positioning of furnish discharge which is correlated with the dimensions and positioning of the metering rolls 50 and 52. One of the metering rolls can be adjustably positioned horizontally, via dotted line slot 162, to assist in proper alignment. The metering rolls 50, 52 rotate about their longitudinal axes 164 and 166, as indicated by the arrows 168 and 170.

In accordance with the teachings of the invention, the metering rolls 50, 52 are formed from materials which possess the necessary characteristics for positive gripping of the furnish, compressing the furnish, and controlling forward movement without shearing the column of material being formed and metered through metering nip 54.

In working with lightweight pressure-refined wood furnish, the compression ratio imposed by the metering rolls 50, 52 should not be substantially greater than 4:1. That is, the cross-sectional area of the furnish as delivered from the profiling chamber, measured in a plane perpendicularly transverse to the direction of movement of the furnish, should not be greater than about four times the cross-sectional area, similarly measured, of metering nip 54. Since one dimension is being held substantially constant (as shown the lateral dimension), the remaining dimension (as shown the longitudinal dimension) is selected and controlled to effect the desired compression. In practice, when working with the pressure-refined wood fibers of the specific embodiment, the ratio should be in the range of 2:1 to about 3:1.

With the selected compression ratio and metering roll of selected characteristics, the furnish will be compressed into the proper configuration for accurate metering and steady movement without shearing of the furnish column. Selected bristle materials provide satisfactory surface characteristics for the metering rolls.

Moisture absorption properties should be considered in selecting bristle materials for the metering rolls, scalping roll, and distribution brush rolls. Furnish may be premixed with curable resin binders which can be in liquid form. Also, moisture content of the fibrous material can vary dependent on ambient conditions, previous handling, and conditioning practices. By selecting bristle material of low moisture absorption properties, e.g. about 5% by weight or less, accumulation of resin on the brush rolls is avoided. Polypropylene, which exhibits moisture absorption of about 2% by weight, is preferred for this purpose. The bristle material should also be capable, by suitable roll assembly techniques, of exhibiting other desired characteristics.

Bristles for metering rolls 50, 52 should be short in length, e.g. about two inches on a roll having a diameter of approximately sixteen inches, with the bristles tightly wound, spirally. These rolls are driven by a variable speed drive so the RPM of the metering rolls can be adjusted to meet mat basis weight and production speeds. The metering rolls 50, 52 rotate at a relatively low speed, typically about three RPM, in handling lightweight furnish.

The controlled flow of the metered furnish from nip 54 impinges on scalping roll 56 rotating in the direction shown by arrow 172 in FIG. 2. Scalping roll 56 rotates about its axis 174 which is laterally oriented; axis 174 is aligned with and substantially parallel to the axes 164 and 166 of metering rolls 50 and 52. The surface of roll 56 should provide the desired scalping action. Bristles, tightly wound spirally, i.e. in a spiral or helical curve, provide the desired action. Scalping roll 56 is rotated to provide a high surface velocity of about 2000 fpm to 3600 fpm in a representative embodiment working with lightweight furnish.

The distribution roll brushes rotate about their respective axes which are laterally oriented and aligned in parallel relationship with axes of the scalping roll 56, the metering rolls 50, 52, and with each other. Direction of rotation, as shown in FIG. 3, is selected to aid uniformity of distribution. The upper distribution rolls 83, 84 rotate to impose a horizontal component of motion which is outwardly directed with relation to the triangular configuration formed by the banks of distribution brushes; the two bottom rolls 87, 88 may rotate inwardly to prevent furnish from striking the leading and trailing ends of the distribution chamber. The RPM of each roll can be set to suit fiber geometry and flow rate. The distribution brushes are preferably formed from spaced, axially-extending, parallel, rows of bristles distributed about their peripheries as shown in FIG. 3.

Referring to FIG. 1, cyclone flop gates 16, 18 are pivotally mounted and establish substantially equal flow in both lateral directions of bidirectional screw 14 which is driven by motor 180. Metering rolls 50, 52, scalping roll 56, and distribution brush rolls 83–88 are supported at their respective longitudinal ends providing drive connections.

Referring to FIG. 2, from shaker screen chamber 130, in which the shaker screen is vibrated by drive 182, a furnish with individualized fibers passes through a drop zone forming part of orientation chamber 140. The fibers can be oriented by an electrical field established by a bank 184 of electrically conductive rods as described in above referenced copending application Ser. No. 4,857.

The handling methods and apparatus taught are applicable to furnishes including wood shavings and flakes as well as lightweight comminuted fibrous furnishes produced by disk refining of wood pieces. Furnishes produced by pressurized steam refining of wood particles have, in the past, presented difficult handling problems which impeded economical production rates. Therefore, while the principles taught are generally applicable to particulate furnishes for manufacture of composition board, specific data will be presented on what has been considered the most difficult to handle furnish.

Pressure refined wood comprises, for the most part, extremely fine hair-like fibers of less than one mil in diameter, generally from about $\frac{1}{4}$ to about $\frac{1}{2}$ inch in length but extending up to $\frac{3}{4}$ inch. A significant portion by weight comprises splinter-like pieces of varying length about $\frac{1}{4}$ inch to $\frac{1}{2}$ inch; and, the remainder is dusk-like. This furnish generally exhibits agglomerating characteristics similar to those of cotton fibers. The flow rates achieved with this material constitute a significant contribution of the present teachings. For example, in a representative specific embodiment, in excess of 300 pounds per minute of pressure-refined wood fiber furnish, having a bulk density of about $1\frac{3}{4}$ pounds per cubic foot, can be uniformly distributed to provide a deposition rate of about four (4) pounds per square foot per minute over a preselected area on the support web of approximately seventy-five (75) square feet. With the forming conveyor support web 142 moving at a linear speed of fifty (50) feet per minute, the end product after compaction and curing under pressure and heat, will have a thickness of $\frac{1}{8}$ of an inch at a density of fifty pounds per cubic foot; at a linear speed of twenty-five (25) feet per minute for the support web, the panel will have a thickness of $\frac{1}{4}$ inch after compaction and curing.

Utilizing the over-feed system for continuous-flow handling, the bidirectional feed screw will be rotated at about fifty (50) RPM; metering rolls of sixteen (16) inch diameter are operator controlled and rotate at about three (3) RPM; a ten (10) inch diameter scalping roll rotates at about 750 to 1000 RPM, and sixteen (16) inch diameter distribution rolls rotate at an average of about 500 RPM. The operator controlled distribution rolls can vary between 250 and about 750 RPM dependent upon characteristics of the furnish including moisture content. The drive motor for the shaker screen is operated to provide cyclic vibrations for the screening wires dependent on the materials, e.g. about 1000 per minute.

Furnish flow and uniform distribution can be provided at forming density deposition rates determined by available capacity of the curing and pressing facility. Where the flow rates available with the present invention exceed available curing and pressing capacities at a particular site, it is preferred to utilize optimum continuous flow rates for the particular forming line, which can exceed five (5) $\#/ft^2$/minute for lightweight furnish;

furnish deposition above available curing capacity can be shaved off before pressing and returned to the input side of the line.

Suitable resin binder systems using urea formaldehyde, phenol formaldehyde, isocyanate, and tannin formaldehyde are well known in the art as are the techniques for proper addition of the resin and for curing.

Along with the principles of operation, physical values such as weights of furnish handled, dimensions, configuration, placement of structures, and RPM or linear movement of various elements have been set forth in describing commercially practical process line methods and apparatus. In the specific embodiment shown, the lateral dimension has been described for the initial distribution step while the furnish is confined in the longitudinal direction for metering. In the light of this disclosure, modifications can be made in these physical values while still relying on the principles taught. Also, while final distribution over the dimension in the machine forming direction as shown is preferred, distribution over this dimension could be taken up first while utilizing the principles of metering and controlled continuous flow taught. Therefore, in determining the scope of the invention, reference should be made to the appended claims.

I claim:

1. In continuous-line manufacture of fiberboard, a method providing for uninterrupted movement of lightweight comminuted furnish through a forming line without relying on pneumatic impulsion and uniformly distributing such furnish for electric field orientation and delivery over a preselected area to continuously form a mat of such fibrous furnish, comprising providing a lightweight, comminuted, fibrous furnish including elongated, fine-textured fibers, providing a forming line including means for feeding furnish into the forming line located in vertically spaced relationship from a conveyor means for deposition of furnish to form a mat, with the forward direction of movement for furnish in the forming line being from the means for feeding furnish into the forming line toward the conveyor means, such conveyor means presenting a mat support web, controllably moving such web to present a surface of preselected area for deposition of furnish, such web movement establishing a forming direction for the mat being formed by deposition of furnish, such preselected area of deposition establishing a dimension in the forming direction and a dimension perpendicularly transverse to the forming direction, continuously feeding such fibrous furnish into the forming line, moving such furnish including an excess through a distributor disposed to move such furnish transversely to the forward direction of movement of furnish to distribute such furnish substantially uniformly over one dimension of the preselected area of deposition while returning excess furnish for recycling, delivering furnish in the forward direction, passing the furnish distributed over such one dimension of the selected area of deposition through a flow-through header chamber so as to maintain a substantially uniform head of furnish in such header chamber, confining such furnish to a fractional portion of the remaining dimension of the preselected area of deposition, controllably metering removal of furnish from such header chamber in the forward direction by continuously removing furnish from such header chamber, uniformly distributing such controllably metered furnish removed from such header chamber over the remaining dimension of the preselected area of deposition, such distribution over the remaining dimension being substantially free of pneumatic impulsion, delivering such furnish uniformly distributed over substantially the full selected area of deposition toward the support web along a flow path having a direction which is substantially normal to the surface of deposition, and directing such furnish as uniformly distributed over the full area of deposition into an electric field orientation chamber means for orientation and deposition on the moving web.

2. The method of claim 1 in which such fibrous furnish as fed into the forming line is divided into substantially equal parts for distribution in opposite directions over such one dimension of the preselected area of deposition.

3. The method of claim 1 in which such fibrous furnish is continuously fed into the forming line at a rate in excess of that required to be distributed for the mat being formed, and including the step of removing furnish from the forming line in excess of that required for the mat being formed after distributing furnish over such one dimension.

4. The method of claim 1 including the step, after controllably metering removal of such fibrous furnish from the flow-through header chamber, of subdividing such metered furnish into two substantially equal portions for distribution over such remaining dimension of the preselected area of deposition.

5. The method of claim 1 in which the distribution of such furnish over the remaining dimension is carried out by directing the metered furnish into mechanical contact with a plurality of rotatably mounted rolls which are distributed over substantially the full preselected area for deposition of furnish, including the step of rotating such plurality of rolls about their respective longitudinal axes with the metered furnish being directed for passage between and about such plurality of rotating rolls, such plurality of rotating rolls imparting a component of movement to the furnish transverse to the forward direction to affect rate of movement of such furnish in the forward direction.

6. The method of claim 1 including the step of maintaining uniformity of distribution across such first dimension of distribution while distributing furnish over the remaining dimension of distribution.

7. The method of claim 2 including the step of treating the furnish as uniformly distributed over the full selected area of deposition to separate fiber clusters into individual fibers by passage of such furnish through screening chamber means prior to directing such furnish into the electric field orientation chamber means.

8. The method of claim 1 including the step of coordinating controlled metering of furnish from the flow-through header chamber and controlled movement of the support web in the forming direction to selectively control the weight per unit area of furnish deposited to form the mat.

9. The method of claim 1 including the step of mechanically contacting such metered furnish to controllably impart movement of furnish in the forward direction while at least partially supporting such controllably metered furnish in the vertical direction and imparting impulsion to accelerate movement of such metered furnish in the forward direction.

10. The method of claim 9 including the step of controlling access of ambient air into the forming line at a location contiguous to such mechanical contact to impart movement of such metered furnish in the forward direction.

11. The method of claim 1 in which such support web has a longitudinal axis extending in the forming direction and a lateral dimension measured perpendicularly to such longitudinal axis in the plane of such web, with such lateral dimension of the web being at least equal to the lateral dimension of the mat being formed and, in which the initial distribution step of furnish in one dimension comprises uniformly distributing furnish over such lateral dimension, and the step of distributing furnish over the remaining dimension after metering comprises uniformly distributing furnish over the longitudinal dimension, measured in the machine-forming direction, of the preselected area of deposition on such web.

12. The method of claim 11 in which such fibrous furnish continuously fed into the forming line consists essentially of pressure-refined wood fibrous material, such furnish having a weight of about 1 to about 4 pounds per cubic foot and in which the controllably metered removal of furnish from the flow-through header chamber is carried out by positively gripping such longitudinally-confined furnish, and compressing such furnish in such direction of confinement during such controlled metering, such compression of the furnish during metering being carried out with a compression ratio in the direction of confinement in the range of about 2:1 to about 4:1.

13. The method of claim 12 in which the compression ratio during controlled metering is in the range of 2:1 to 3:1.

14. In continuous-line manufacture of fiberboard, a method providing for uninterrupted movement of lightweight comminuted fibrous furnish through a forming line at a substantially constant rate free of pneumatic impulsion and uniformly distributing such furnish for delivery over a preselected area substantially free of turbulence effects enabling fiber orientation in an electric field to continuously form a mat of such fibrous furnish, comprising providing a lightweight, comminuted, fibrous furnish including elongated, fine-textured fibers, providing a forming line with means for feeding furnish into the forming line located in vertically spaced relationship from a conveyor for deposition of furnish to form a mat, with the forward direction of movement for furnish in the forming line being toward the conveyor, such conveyor presenting a mat support web, controllably moving such web to present a surface of preselected area for deposition of furnish, such web movement establishing a forming direction for the mat being formed by deposition of furnish, such preselected area of deposition establishing a dimension in the forming direction and a dimension perpendicularly transverse to the forming direction, continuously feeding such fibrous furnish into the forming line, moving the furnish fed into the forming line transversely to such forward direction of movement of furnish to distribute furnish substantially uniformly over one dimension of the preselected area of deposition while delivering such distributed furnish in the forward direction, maintaining a substantially uniform head of furnish in a flow-through header chamber, passing such furnish distributed over one dimension of the selected area of deposition through such header chamber while confining such furnish to a fractional portion of the remaining dimension of the preselected area of deposition, controllably metering removal of furnish from such header chamber in such forward direction by continuously removing furnish from such header chamber to establish a substantially constant weight per unit time movement of furnish in the forward direction through the forming line, mechanically contacting such metered furnish to controllably direct such furnish in the forward direction substantially free of pneumatic impulsion, then, uniformly distributing such furnish over the remaining dimension of the preselected area of deposition, such distribution out the remaining dimension being free of pneumatic impulsion while imparting a component of movement to the furnish in a direction transverse to its forward direction of movement, delivering furnish uniformly distributed over substantially the full selected area of deposition toward the support web along a flow path having a direction substantially normal to the surface of deposition at a velocity providing for desired orientation in an electrical field, and directing such furnish as uniformly distributed over the full area of deposition into an electrical field for orientation and deposition on the moving web.

* * * * *